United States Patent [19]

Kurusu et al.

[11] Patent Number: 4,538,477
[45] Date of Patent: Sep. 3, 1985

[54] TILTABLE STEERING SHAFT ASSEMBLY FOR AUTOMOTIVE VEHICLES

[75] Inventors: Toshiro Kurusu; Hakumi Ishii, both of Toyota, Japan

[73] Assignee: Toyota Jidosha Kabushiki Kaisha, Japan

[21] Appl. No.: 591,962

[22] Filed: Mar. 21, 1984

[30] Foreign Application Priority Data

Mar. 30, 1983 [JP] Japan .................................. 58-56347

[51] Int. Cl.³ .............................................. B62D 1/18
[52] U.S. Cl. ...................................... 74/493; 74/540; 280/775
[58] Field of Search .................. 74/493, 540; 280/775

[56] References Cited

U.S. PATENT DOCUMENTS 4,102,218   7/1978   Naka et al. ............................ 74/540

FOREIGN PATENT DOCUMENTS 58-30570   2/1983   Japan .
703401   12/1979   U.S.S.R. ................................ 74/540

Primary Examiner—Larry I. Schwartz
Assistant Examiner—David W. Westphal
Attorney, Agent, or Firm—Parkhurst & Oliff

[57] ABSTRACT

A fastening device for a tiltable steering shaft assembly of the type in which, when shifted into a remote position upwardly from a pre-selected angular position, the steering wheel is automatically returned to the pre-selected angular position and locked at the same position only by depression of the steering wheel. The fastening device comprises a first manual lever arranged to release the fastening device for permitting upward movement of the steering wheel to the remote position, and a second manual lever arranged to readjust the pre-selected angular position of the steering wheel in accordance with a user's physique, in which the first manual lever is cooperable with the second manual lever in operation of the latter to carry out readjustment of the pre-selected angular position of the steering wheel in a simple manner. The fastening device further includes a mechanism for avoiding unexpected trouble caused by an error in operation of the second manual lever.

4 Claims, 12 Drawing Figures

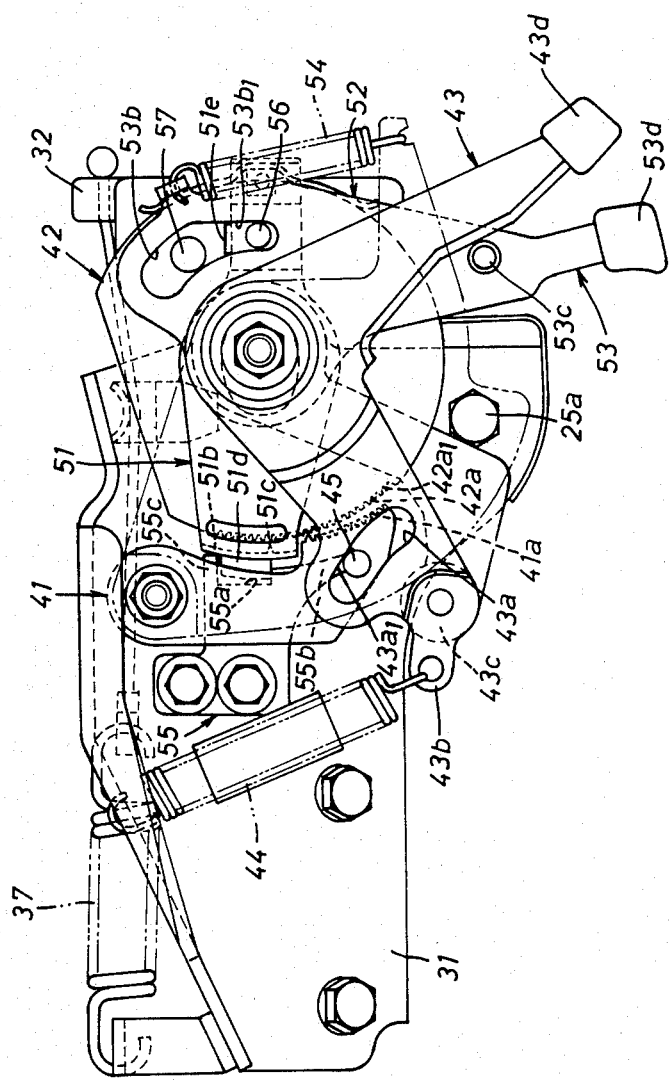

TILTABLE STEERING SHAFT ASSEMBLY FOR AUTOMOTIVE VEHICLES

BACKGROUND OF THE INVENTION

The present invention relates to a tiltable steering shaft assembly for automotive vehicles, and more particularly to an improvement of a fastening device for a tiltable steering shaft assembly of the type in which, when shifted into a remote position upwardly from a pre-selected angular position, the steering wheel is automatically returned to the pre-selected angular position and locked at the same position only by depression of the steering wheel.

In U.S. Pat. No. 4,102,218 issued on July 25, 1978, a fastening device for a tiltable steering shaft assembly has been proposed which comprises a stationary bracket mounted on the vehicle body structure for supporting the shaft assembly in place at a predetermined angle, a movable bracket secured to a tubular housing and pivoted to the stationary bracket for angular adjustment of a tiltable steering shaft journalled within the tubular housing, a toothed portion in the form of a sector gear integral with a free end of the movable bracket, a latch member pivoted to a side portion of the stationary bracket to be engaged with the toothed portion of the movable bracket in a locked position, a manual lever pivoted to the stationary bracket and cooperable with the latch member to move it toward an unlocked position, an engaging element provided on the manual lever and in engagement with the latch member to hold it in the locked position when the manual lever is released, and a spring for biasing the manual lever to maintain it in its released position. In use of the tiltable steering shaft assembly, it is advantageous that the angular position of the steering wheel can be adjusted step-wise to a desired angular position in such a way as to give a click feeling to the driver. It has, however, been needed to adjust the steering wheel to the desired angular position at each time after being shifted into a remote position upwardly with respect to the desired angular position to facilitate entry and exit of the driver into and out of the vehicle compartment.

For the purpose of eliminating such an inconvenience in use as described, in Japanese Utility Model Early Publication No. 58-30570, there has been proposed an improvement of the fastening device for the tiltable steering shaft assembly in which when shifted into a remote position upwardly from a pre-selected angular position, the steering wheel is automatically returned to the pre-selected angular position and locked at the same position only by depression of the steering wheel. The improved fastening device comprises a first manual lever arranged to release a lock of the fastening device for permitting upward movement of the steering wheel to the remote position, and a second manual lever arranged to readjust the pre-selected angular position of the steering wheel in accordance with the driver's physique. In use of the fastening device, it has, however, been experienced that during the process of readjusting the pre-selected angular position of the steering wheel, the second manual lever has to be operated in relation to operation of the first manual lever in a complicated manner.

SUMMARY OF THE INVENTION

It is, therefore, the primary object of the present invention to provide an improved fastening device for the tiltable steering shaft assembly capable of readjusting a pre-selected angular position of the steering wheel in a simple manner and further capable of avoiding unexpected trouble caused by an error in operation for readjustment of the shaft assembly.

According to the present invention, the foregoing objects are accomplished by a fastening device for a titltable steering shaft assembly including a steering shaft tiltably connected to steering gear means in an automotive vehicle and mounted thereon with a steering wheel, and a tubular housing having the steering shaft journalled therein. The fastening device comprises a stationary bracket mounted on a portion of the vehicle body structure for supporting the shaft assembly in place at a predetermined angle, a movable bracket secured to the tubular housing and pivoted to the stationary bracket for angular adjustment of the steering wheel in a vertical direction, the movable bracket being provided at a free end thereof with a toothed portion in the form of a sector gear, a latch member pivoted to a side portion of the stationary bracket and movable between a locked position in which the latch member is in engagement with the toothed portion of the movable bracket to lock the steering wheel in a selected angular position and an unlocked position in which the latch member disengages from the toothed portion of the movable bracket to permit free movement of the movable bracket, a first manual lever pivoted to the stationary bracket and movable perpendicularly with respect to the pivot axis, an engaging element provided on the first manual lever and in engagement with the latch member for maintaining it in the locked position when the first manual lever is in a released position and for permitting movement of the latch member to the unlocked position when the first manual lever is operated to a predetermined angular position from its released position, first resilient means for biasing the first manual lever toward its released position, second resilient means for biasing the steering wheel into a remote position upwardly with respect to the selected angular position, and first cam means cooperable with the first manual lever for effecting movement of the latch member to the unlocked position in response to operation of the first manual lever to the predetermined angular position and for permitting movement of the latch member to the locked position in response to release of the first manual lever.

The fastening device further comprises a movable plate mounted on the pivot axis and movable perpendicularly with respect to the pivot axis, the movable plate being integrally formed at one end thereof with a receiver portion which is releasably in engagement with the toothed portion of the movable bracket to determine the locked position of the latch member and to receive thereon the latch member in its unlocked position, third resilient means for biasing the movable plate toward the toothed portion of the movable bracket, a second manual lever pivoted to the stationary bracket and movable perpendicularly with respect to the pivot axis, the second manual lever being arranged to be engaged with the first manual lever when operated toward the first manual lever over a predetermined angular position, fourth resilient means for biasing the second manual lever toward a released position spaced from the released position of the first manual lever, stopper means for receiving the second manual lever by engagement therewith to maintain it in its released position under the biasing force of the fourth resilient means, second cam means cooperable with the second manual lever for disengaging the receiver portion of the movable plate from the toothed portion of the movable bracket in response to operation of the second manual lever toward the first manual lever and for engaging the receiver portion of the movable plate with the toothed portion of the movable bracket in response to release of the second manual lever, and retainer means for retaining the receiver portion of the movable plate by engagement therewith in its disengaged position. The movable bracket is further provided with a lateral projection which is arranged to be abutted against an end face of the movable plate when relative angular movement between the movable bracket and the movable plate caused by an error in operation of the second manual lever reaches a predetermined angle. This is useful to restrict an excessive angular movement of the movable bracket in relation to the movable plate.

In the actual practice of the present invention, it is preferable that the toothed portion of the movable bracket is in the form of a toothed portion of a ratchet member secured to a free end of the movable bracket and located in a common vertical plane with the latch member. In this arrangement, preferably the lateral projection is in the form of a lateral pin fixed to the ratchet member, and the movable plate is integrally provided at the other end portion thereof with a lug which is arranged to be abutted against the lateral pin of the ratchet member.

BRIEF DESCRIPTION OF THE DRAWINGS

Further and more specific objects, features and advantages of the present invention and the manner in which the invention is carried into practice are made apparent in the following detailed description wherein reference is made to the accompanying drawings, in which:

FIG. 11 is an enlarged side view of the fastening device conditioned in its unlocked position for readjustment of a pre-selected angular position of the steering wheel.

DETAILED DESCRIPTION OF THE PREFERRED EMBODIMENTS

Figure 1:
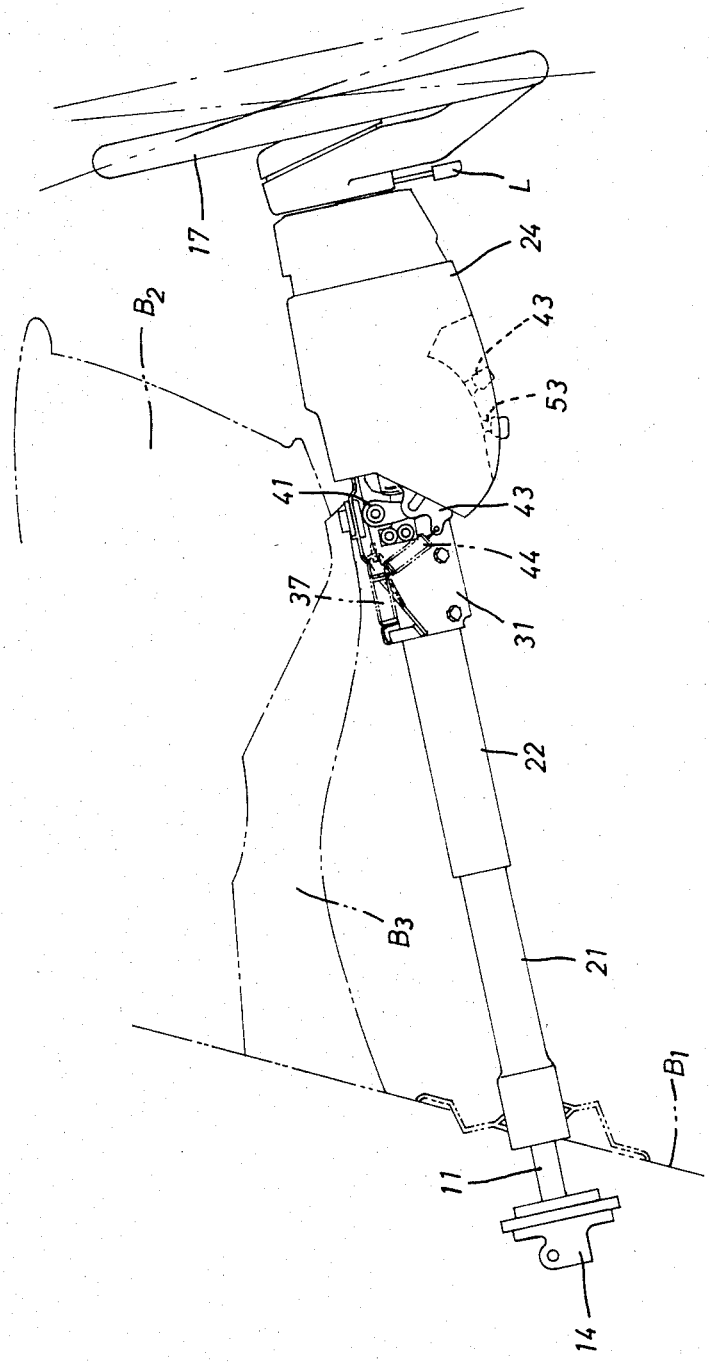
FIG. 1 is a side view of a preferred embodiment of a tiltable steering shaft assembly for automotive vehicles in accordance with the present invention.
Figure 2:
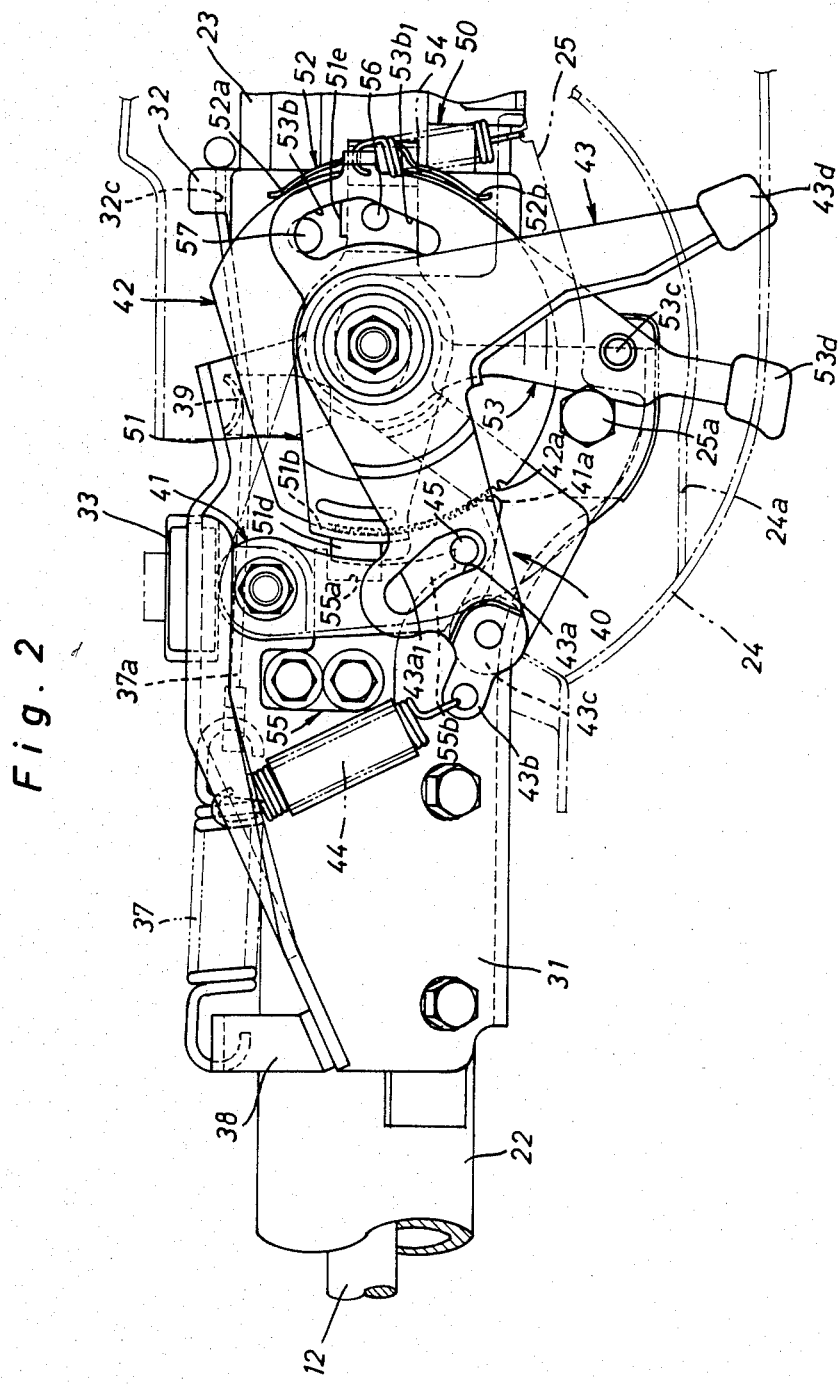
FIG. 2 is an enlarged side view illustrating a fastening device for the tiltable steering shaft assembly.
Figure 3:
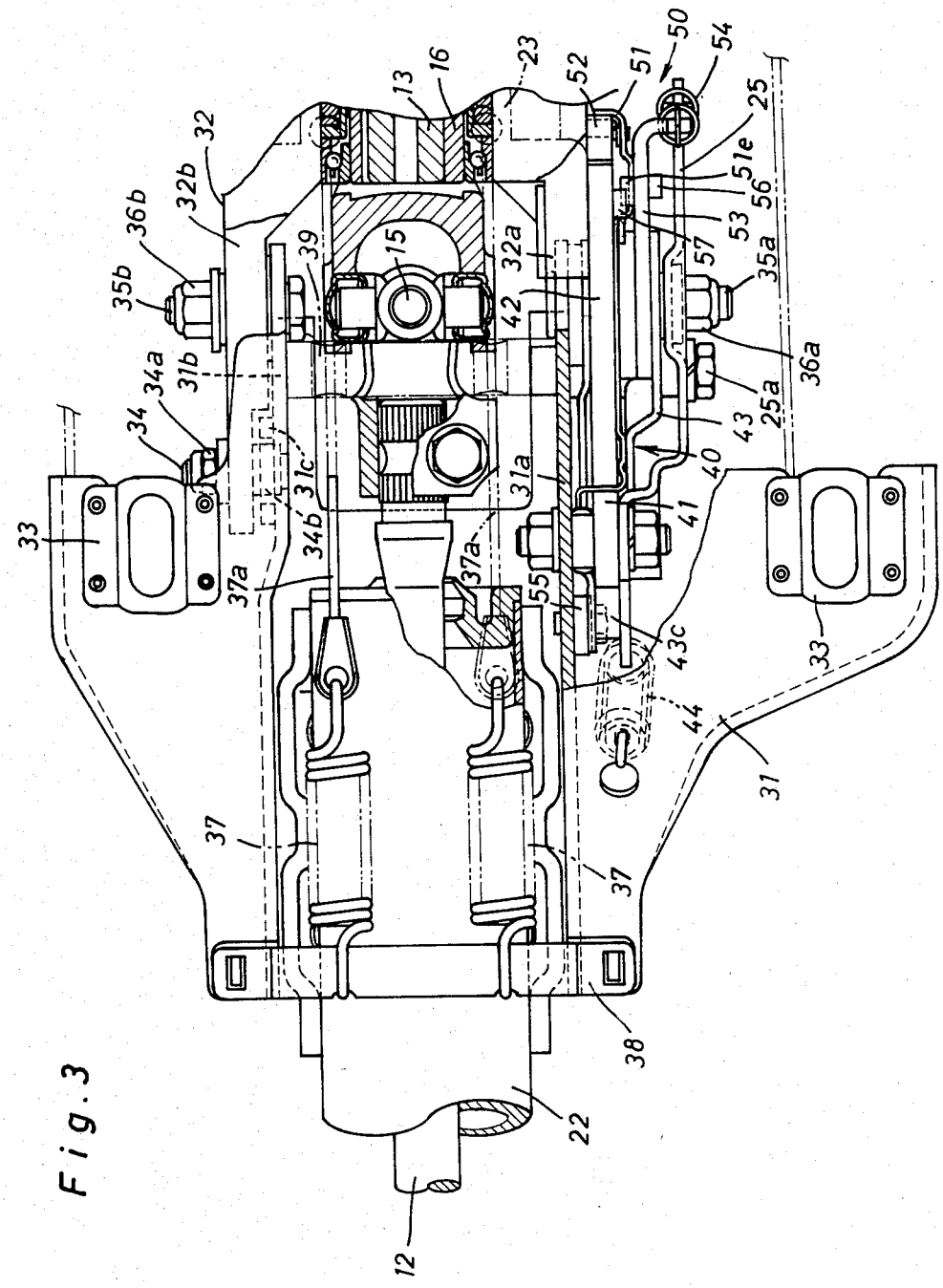
FIG. 3 is a partly broken and enlarged plan view of the fastening device of FIG. 2.

Referring now to the drawings, particularly in FIGS. 1-3 there is illustrated a tiltable steering shaft assembly of the telescopic type which is adjustable in its axial direction. The steering shaft assembly is provided with first and second manual levers 43, 53 which are operated to adjust an angular position of a steering wheel 17 as shown by dash and two dotted lines in FIG. 1. The shaft assembly is further provided with a third manual lever L which is operated to release lock of a telescopic mechanism (not shown) for the shaft assembly so as to adjust an axial position of the steering wheel 17. The shaft assembly includes a lower tubular shaft 11, a middle shaft 12 connected to shaft 11, and an upper shaft 13 connected to shaft 12 through a universal joint 15. The lower tubular shaft 11 extends outwardly through a toe board $B_1$ of the vehicle compartment and is connected at its lower end to a steering gear means (not shown) through a flexible coupling 14. The upper portion of shaft 11 has a rectangular cross-section and is connected to the lower portion of shaft 12 in an axially slidable and torque transmissible manner. As can be well seen in FIG. 3, the upper shaft 13 is supported by a tubular member 16 which is secured to the upper portion of universal joint 15. The upper shaft 13 is axially slidable in tubular member 16 in a torque transmissible manner and is releasably locked to tubular member 16 by means of a locking device for the telescopic mechanism. The locking device is arranged to be released by operation of the third manual lever L, and the steering wheel 17 is fixedly mounted on the upper end of shaft 13.

Figure 4:
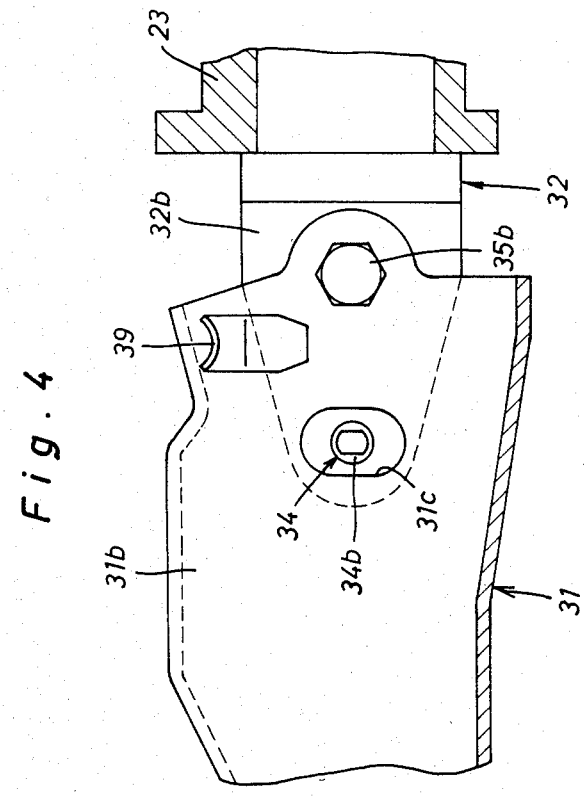
FIG. 4 is a partly enlarged side view illustrating a pivot portion of stationary and movable brackets shown in FIG. 3.

A column tube assembly includes first, second and third tubular housings 21, 22, and 23. The first tubular housing 21 contains therein the lower shaft 11 and is anchored at its lower end to the toe board $B_1$. The upper portion of tubular housing 21 is coupled with the second tubular housing 22 through a conventional impact energy absorbing means. The second tubular housing 22 contains therein the middle shaft 12 and is supported by a stationary pedal bracket $B_3$ by way of a stationary bracket 31 which is secured to the outer periphery of tubular housing 22 by fastening bolts. The stationary pedal bracket $B_3$ is fixedly mounted at its front end on the toe board $B_1$ and is located under an instrument panel $B_2$ of the vehicle body. As can be well seen in FIG. 4, the third tubular housing 23 is integrally secured at its lower end to a movable bracket 32 which is pivoted to the stationary bracket 31, as will be described in detail later. The tubular member 16 is rotatably supported by way of a pair of bearings within the third tubular housing 23.

The stationary bracket 31 includes a U-shaped body portion with a pair of lateral flanges and a pair of vertical arms 31a, 31b extending upwardly from the body portion. The lateral flanges of bracket 31 are provided thereon with a pair of breakable capsules 33, 33 which are fixedly assembled to the rear end of stationary pedal bracket $B_3$. Pivoted on the left arm 31a of bracket 31 is a latch member 41 by means of a lateral pin, a pair of nuts and a pair of washers to be moved in a vertical direction. As can be well seen in FIG. 4, the right arm 31b of bracket 31 is provided with an elongated slot 31c. Thus, the stationary bracket 31 is secured through capsules 33, 33 to the stationary pedal bracket $B_3$ by bolts and nuts fastened thereto to fixedly support thereon the second tubular housing 22.

As can be well seen in FIGS. 2 and 3, the movable bracket 32 has a pair of arms 32a, 32b and a pair of spring receiver holes 32c, 32c. A fastening device 40 for the steering shaft assembly comprises a ratchet member 42 integrally secured to the left arm 32a of movable bracket 32 to be engaged with the latch member 41, as is illustrated in FIG. 2. As can be well seen in FIG. 4, the right vertical arm 32b of bracket 32 is integrally provided at the free end thereof with a stopper bolt 34 which is inserted into the elongated slot 31c of stationary bracket 31 to restrict rotary movement of the movable bracket 32 in a predetermined angular extent. The stopper bolt 34 is secured to the free end of arm 32b by means of a fastening nut 34a through a washer and has an annular rubber cushion 34b secured thereto. The movable bracket 32 is assembled with the stationary bracket 31 in such a manner that the arms 32a, 32b of bracket 32 overlap the arms 31a, 31b of bracket 31. Thus, the arms 32a, 32b of bracket 32 are respectively pivoted to the arms 31a, 31b of bracket 31 by means of bolts 35a, 35b and nuts 36a, 36b and are locked in a position in relation to the stationary bracket 31 by means of the fastening device 40. Each axis of the lateral pivot bolts 35a, 35b is aligned on a horizontal common axis passing through the center of universal joint 15. As can be well seen in FIGS. 2 and 3, the movable bracket 32 is biased upwardly by a pair of tension coil springs 37, 37 which are engaged at their one ends with a spring retainer 38 secured to the flanges of stationary bracket 31 and engaged at their other ends with the upper portion of movable bracket 32 through a pair of metallic wires 37a, 37a. The metallic wires 37a, 37a are guided by a pair of guide members 39, 39 secured to the stationary bracket 31 and are fixed in place at the spring receiver holes 32c, 32c.

Assembled on the left side of bracket 31 is the fastening device 40 which is provided with a mechanical memory mechanism as will be described in detail later. The latch member 41 is operatively connected to the first manual lever 43 to be selectively engaged with the toothed portion 42a of ratchet member 42. The latch member 41 is integrally provided at its lower end portion with a first lateral release pin 45 which is inserted into a cam slot 43a in the manual lever 43.

Figure 5:
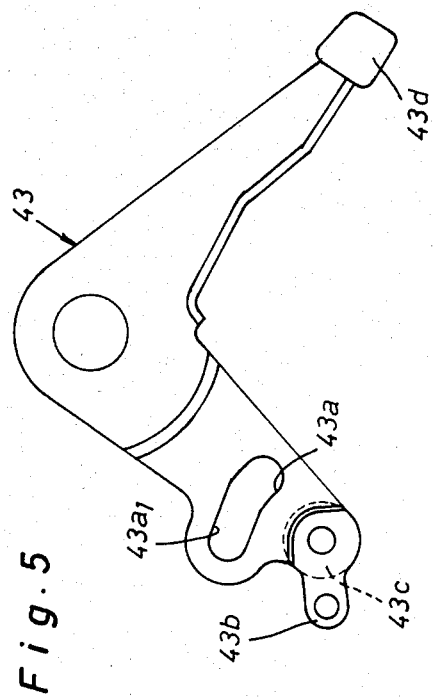
FIG. 5 is a side view of a first manual lever of the fastening device shown in FIG. 2.

As is illustrated in FIG. 5, the manual lever 43 is formed in an L-letter shape and is rotatable on pivot bolt 35a perpendicularly with respect to the horizontal common axis. The manual lever 43 is biased clockwisely by a second tension spring 44 which is engaged at its one end with the front end 43b of lever 43 and at its other end with a portion of stationary bracket 31. A roller 43c is pivoted to the front end portion of lever 43 to be engaged with the bottom face of latch member 41. When the manual lever 43 is in its released position as shown in FIG. 2, the roller 43c is in engagement with the bottom face of latch member 41 under tension of the spring 44 to hold engagement of the latch member 41 with the toothed portion 42a of ratchet 42. On the other hand, the lever 43 extends downwardly through an elongated slot 24a in a column cover 24. When the manual lever 43 is moved counterclockwisely against the tension of spring 44 to a predetermined angular position, the roller 43 separates from the latch member 41, and subsequently the release pin 45 of latch member 41 is moved clockwisely by engagement with the inside face 43a₁ of cam slot 43a, resulting in disengagement of the latch member 41 from the toothed portion 42a of ratchet member 42. (see FIG. 10)

Figure 6:
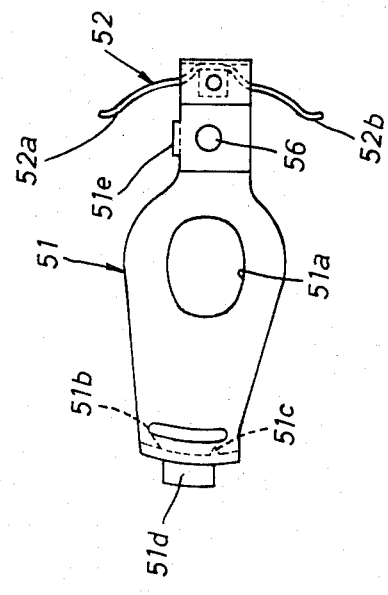
FIG. 6 is a side view of a movable plate of the fastening device shown in FIG. 2.

Hereinafter, the mechanical memory mechanism 50 for the fastening device 40 will be described in detail. The main component parts of the memory mechanism 50 are a movable plate 51, a leaf spring 52, the second manual lever 53, a third tension spring 54, a guide member 55 and a second release pin 6. As is illustrated in FIG. 6, the movable plate 51 is formed at its central portion with an elongated mounting hole 51a and at its front end with a semi-circular receiver portion 51b which is arranged to cover a portion of the toothed portion 42a of ratchet member 42. The receiver portion 51b of movable plate 51 is formed at its inner circumference with a pawl 51c to be meshed with the toothed portion 42a of ratchet member 42 and is integrally formed at its outer circumference with a projection 51d. The second release pin 56 is fixed to the rear portion of movable plate 51, and the leaf spring 52 is riveted to the rear end of movable plate 51. As can be well seen in FIGS. 2 and 3, the movable plate 51 is located outside the ratchet member 42 and rotatably mounted on pivot bolt 35a to be moved perpendicularly with respect to the pivot in a predetermined distance. The leaf spring 52 is slidably engaged at its opposite ends with the rear end face of ratchet member 42 to maintain engagement of the pawl 51c of movable plate 51 with the toothed portion 42a of ratchet 42. In such a condition as shown in FIG. 2, the toothed portion 42a of ratchet member 42 is partially covered by the receiver portion 51b of movable plate 51, and the toothed portion 41a of latch member 41 is engaged at its upper end with the lower end of receiver portion 51b of movable plate 51.

Figure 7:
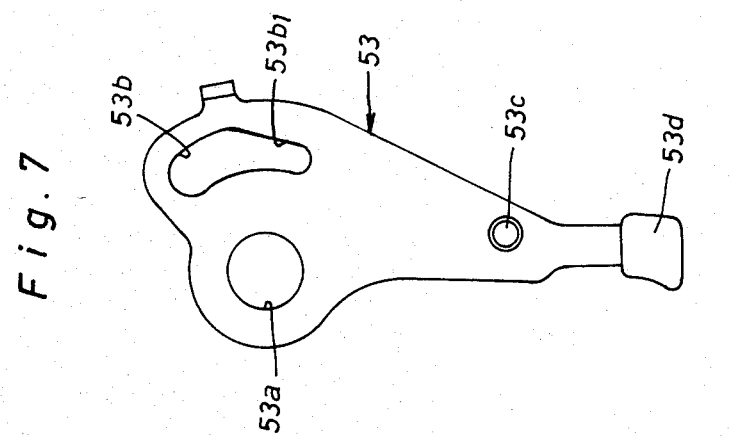
FIG. 7 is a side view of a second manual lever of the fastening device shown in FIG. 2.

As can be well seen in FIG. 7, the second manual lever 53 is formed at its intermediate portion with a circular mounting hole 53a and at its rear portion with a cam slot 53b. The second manual lever 53 is further provided at its lower portion with a pin 53c and at its lower end with an operation knob 53d. The manual lever 53 is located outside the movable plate 51 and rotatably mounted on pivot bolt 53a to be operated upwardly and downwardly. As can be well seen in FIGS. 2 and 3, a retainer plate 25 is located outside the manual lever 43 and fixed in place by a bolt 25a to the stationary bracket 31. The manual lever 53 is biased clockwisely by means of the third tension spring 54 which is engaged at its one end with the rear end portion of retainer plate 25. The clockwise movement of manual lever 53 is restricted by abutment with the bolt 25a. Thus, the knob 53d of lever 53 is located forward a predetermined distance from the knob 43d of lever 43 and extends downwardly through the elongated hole 24a in column cover 24. When the second manual lever 53 is moved counterclockwisely to a predetermined angular position, the pin 53c of lever 53 abuts against an end face of first manual lever 43 to move it integrally therewith. Simultaneously, the second release pin 56 is displaced forwardly by engagement with an inner cam face 53b₁ of cam slot 53b so that the movable plate 51 is displaced to disengage the pawl 51c of its receiver portion 51b from the toothed portion 42a of ratchet member 42. As a result, the ratchet member 42 is released from the movable plate 51 to be rotatable relative to the movable plate 51.

The ratchet member 42 is further integrally provided at its rear portion with a lateral pin 57 which extends to be engaged with a lug 51e of movable plate 51. When the steering wheel 17 is in its upper position or upward remote position, the lateral pin 57 of ratchet member 42 is located in a position as is shown by a solid line in FIGS. 2 or 10. When the steering wheel 17 is adjusted to its lowermost position, the lateral pin 57 of ratchet 42 is located in a position as is shown by an imaginary line in FIG. 10. When the ratchet member 42 in a piece with movable bracket 32 is rotated clockwisely in relation to the movable plate 51 and abuts against the lug 51e of movable plate 51 at its pin 57 in a predetermined angular position, the relative rotation of ratchet member 42 and movable plate 51 is restricted to cause integral rotation thereof.

Figure 9B:
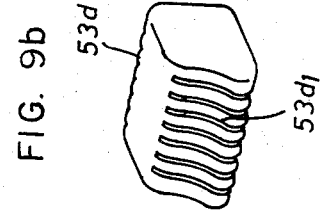
FIG. 9 illustrates each knob of the first and second manual levers shown in FIG. 2.
Figure 8:
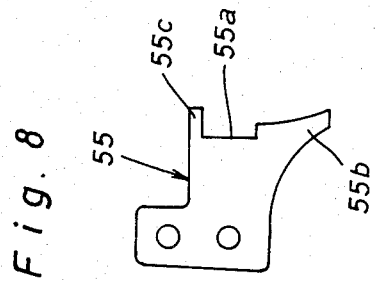
FIG. 8 is a side view of a guide plate of the fastening device shown in FIG. 2.
Figure 9A:
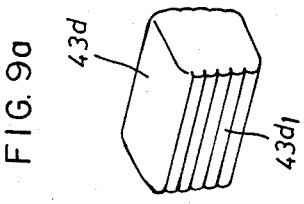

The guide plate 55 is secured in place to the stationary bracket 31 and is located inside the latch member 41 and adjacent the front ends of ratchet member 42 and movable plate 51. As can be well seen in FIG. 8, the guide member 55 is formed with a rectangular recess 55a, a guide projection 55b and a shoulder 55c. The rectangular recess 55a is arranged to receive therein the projection 51d of movable plate 51, and the guide projection 55b extends downwardly along the outer periphery of toothed portion 42a of ratchet member 42. When the movable plate 51 is displaced forwardly in response to counterclockwise rotation of manual lever 53, the projection 51d of movable plate 51 is brought into engagement with the rectangular recess 55a of guide member 55 to restrict rotation of the movable plate 51 in the vertical direction. When the movable plate 51 is rotated in a piece with ratchet member 42 counterclockwisely, the projection 51d of movable plate 51 moves downwardly along a semi-circular end face of the guide projection 55b of member 55. In this embodiment, as can be well seen in FIG. 9 (a) and (b), the knob 43d of first manual lever 43 is formed in a different contour from the knob 53d of second manual lever 53 to give a different finger feel to the driver. The first knob 43d is formed at its opposite faces with lateral ridges $43d_1$, while the second knob 53d is formed at its front face with vertical ridges $53d_1$.

OPERATION

When the fastening device 40 is in its locked position, both the manual levers 43 and 53 are located as shown in FIG. 2. In such a locked condition, the roller 43c of lever 43 is in engagement with the bottom face of latch member 41 under the biasing force of spring 44 to maintain the engagement of latch member 41 with the toothed portion 42a of ratchet member 42. Thus, the movable bracket 32 is locked at a selected angular position with respect to the stationary bracket 31 such that the steering wheel 17 is fixedly positioned at a desired angle with respect to the driver. When it is desired to shift the steering wheel 17 upwardly out of the plane of its pre-selected angular position for facilitating entry and exit of the driver into and out of the vehicle compartment, the knob 43d of first manual lever 43 is operated counterclockwisely against return spring 44. Then, the roller 43c separates from the bottom face of latch member 41, and subsequently the release pin 45 of latch member 41 is moved clockwisely by engagement with the cam face $43a_1$ of cam slot 43a in manual lever 43, resulting in disengagement of the latch member 41 from the toothed portion 42a of ratchet 42. Thus, the movable bracket 32 is released from the stationary bracket 31 and tends to move upwardly under the biasing force of tension springs 37, 37. This causes upward movement of the steering wheel 17 into a remote position with respect to the pre-selected driving position. (see FIG. 10) In this instance, the ratchet member 42 and movable plate 51 move integrally with the movable bracket 32, and the upward movement of movable bracket 32 is restricted by engagement of the stopper bolt 34 against the lower end of slot 31c in the right arm 31b of the stationary bracket 31. (see FIG. 4)

When the manual lever 43 is released after the movable bracket 32 is released, the roller 43c is brought into engagement with the bottom face of latch member 41 under the biasing force of spring 44, and the toothed portion 41a of latch member 41 is received by the receiver portion 51b of movable plate 51 in mesh with the toothed portion 42a of ratchet member 42 at its pawl 51c. If the first manual lever 43 is released during the upward movement of movable bracket 32, the roller 43c will be brought into engagement with the bottom face of latch member 41 under the biasing force of spring 44 and tends to cause meshing engagement of the toothed portion 41a of latch member 41 with the toothed portion 42a of ratchet member 42. In such an instance, the toothed portion 41a of latch member 41 does not engage the toothed portion 42a of ratchet member 42 because the toothed portion 42a of ratchet member 42 is covered by the receiver portion 51b of movable plate 51. Thus, the latch member 41 is slidably received by the receiver portion 51b of movable plate 51, and the steering wheel 17 remains in its remote position to be freely moved downwardly against the biasing force of tension springs 37, 37.

When the driver moves the steering wheel 17 downward after entry into the vehicle compartment, the movable plate 51 united with movable bracket 32 rotates clockwisely to the pre-selected angular position, and the latch member 41 slides on the receiver portion 51b of movable plate 51. When the steering wheel 17 is returned to the pre-selected angular position, the latch member 41 disengages from the lower edge of the receiver portion 51d of movable plate 51 and engages the toothed portion 42a of ratchet member 42 under the biasing force of spring 44. Thus, the fastening device 40 is locked at the same position as previously locked so that the steering wheel 17 is fixed in the pre-selected angular position. From the above description, it will be understood that the steering wheel 17 can be shifted up toward the remote position only by operation of the manual lever 43 and returned to the pre-selected angular position only by depression of the steering wheel 17.

When it is desired to adjust the pre-selected angular position of the steering wheel 17 in accordance with the driver's physique, the knob 53d of second manual lever 53 positioned as shown in FIG. 2 is operated counterclockwisely to displace the movable plate 51 forwardly by sliding engagement of the release pin 56 with the cam surface $53b_1$ of slot 53b in movable plate 51 against the biasing force of leaf spring 52. During the counterclockwise rotation of the second manual lever 53, the first manual lever 43 is brought into engagement with the pin 53c of lever 53 and is moved counterclockwisely against the biasing force of return spring 44. As a result, the pawl 51c of movable plate 51 disengages from the toothed portion 42a of ratchet member 42 to permit relative rotation of the ratchet member 42 to the movable plate 51, while the projection 51d of movable plate 51 is brought into engagement with the rectangular recess 55a of guide member 55 and retained in its displaced position to restrict rotation of the movable plate 51. During the counterclockwise rotation of the first manual lever 43, the roller 43c separates from the bottom face of latch member 41, and subsequently the release pin 45 of latch member 41 is moved clockwisely by engagement with the cam surface 43a₁ of slot 43a in manual lever 43, resulting in disengagement of the latch member 41 from the toothed portion 42a of ratchet member 42. Thus, as can be well seen in FIG. 11, the steering wheel 17 on movable bracket 32 united with ratchet member 42 is conditioned to be movable in the vertical direction. When moved upwardly or downwardly with the second manual lever 53 in its operated position, the steering wheel 17 can be freely readjusted to a desired angular position.

When the first and second manual levers 43 and 53 are released after readjustment of the steering wheel 17 to the desired angular position, the latch member 41 is moved toward the toothed portion 42a of ratchet member 42 by engagement with the roller 43c under the biasing force of return spring 44 and is meshed with the toothed portion 42a of ratchet member 42 to lock the steering wheel 17 at its readjusted angular position. Simultaneously, the pin 56 of movable plate 51 is released from the cam surface 53b₁ of slot 53 to effect retraction of movable plate 51. Thus, the pawl 51c of movable plate 51 is meshed with the toothed portion 42a of ratchet member 42 at a position corresponding to the readjusted angular position of the steering wheel 17. This means that the memory mechanism 50 has been set to lock the steering wheel 17 at the readjusted angular position. As is understood from the above description, the preferred embodiment is characterized in that the second manual lever 53 is arranged to operate the first manual lever 43 by engagement therewith so as to facilitate the angular adjustment of the steering wheel 17.

Figure 10:
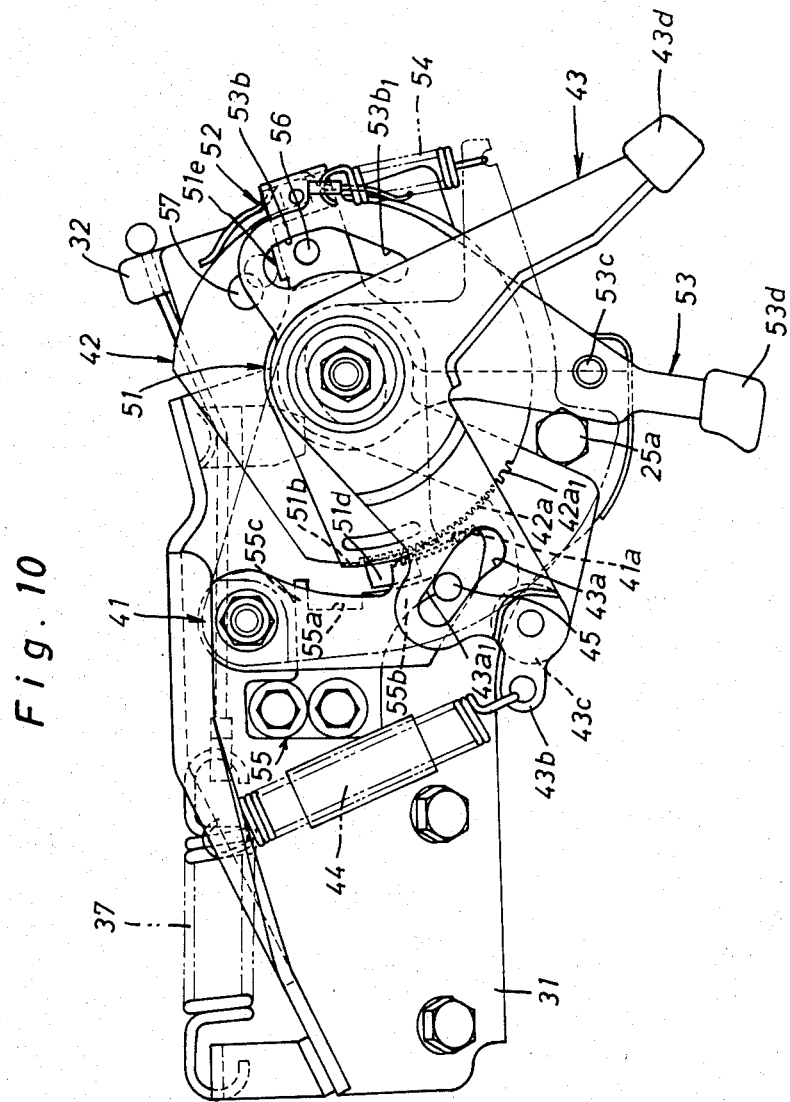
FIG. 10 is an enlarged side view of the fastening device conditioned in its unlocked position for shifting the steering wheel into a remote position upwardly.

In the above embodiment, it is noted that if the ratchet member 42 is rotated clockwisely in relation to the movable plate 51 over a predetermined angle during readjustment of the steering wheel 17 to the desired position, the pin 57 of ratchet 42 will be brought into engagement with the lug 51e of movable plate 51 to restrict further relative rotation between ratchet member 42 and movable plate 51 thereby to ensure the engagement of the pawl 51c of movable plate 51 with the toothed portion 42a of ratchet member 42 after the adjustment. It is also noted that if the second manual lever 53 is erroneously operated counterclockwisely under a condition where the steering wheel 17 is in its upward remote position, as shown in FIG. 10, the pawl 51c of movable plate 51 is disengaged from the toothed portion 42a of ratchet member 42 to permit relative rotation between the ratchet member 42 and movable plate 51, while the projection 51d abuts against the semi-circular end face of the guide projection 55b of stationary plate 55. In such a condition, if the steering wheel 17 is moved downwardly to rotate the ratchet member 42 relatively to the movable plate 51 over a predetermined angle, the lateral pin 57 of ratchet member 42 will abut against the lug 51e of movable plate 51 to restrict the relative rotation between the ratchet member 42 and movable plate 51. As a result, the movable plate 51 is rotated clockwisely in a piece with the ratchet member 42 such that the projection 51d of movable plate 51 abuts against the shoulder 55c of guide plate 55 to be received by the rectangular recess 55a of guide plate 55. In such operation, the guide projection 55b of member 55 acts to guide the movement of projection 51d of movable plate 51. Thus, the lateral pin 57 of ratchet member 42 acts to reliably prevent an error in operation of the fastening device 40 and the memory mechanism 50.

Furthermore, it is noted that in operation of the manual levers 43 and 53, the first manual lever 43 can be easily distinguished from the second manual lever 53 in the user's finger feel because the knob 43d of first manual lever 43 is different in its contour from the knob 53d of second manual lever 53.

In the actual practices of the present invention, the toothed portion 42a of ratchet member 42 may be formed on a free end of the movable bracket 32 without provision of the ratchet member 42, and the movable plate 51 may be formed with a recess which corresponds with the rectangular recess of guide member 55 whereas the guide member 55 may be formed with a projection which corresponds with the projection 51d of movable plate 51. Alternatively, the tension springs 37 may be fixed at their one ends to a portion of the vehicle body structure, and the toothed portion 42 may be formed on the stationary bracket 31 whereas the latch member 41 may be pivoted to the movable bracket 32.

Having now fully set forth both structure and operation of a preferred embodiment of the concept underlying the present invention, various other embodiments as well certain variations and modifications of the embodiment herein shown and described will obviously occur to those skilled in the art upon becoming familiar with said underlying concept. It is to be understood, therefore, that within the scope of the appended claims, the invention may be practiced otherwise than as specifically set forth herein.

What is claimed is:

1. A fastening device for a tiltable steering shaft assembly including a steering shaft tiltably connected to steering gear means in an automotive vehicle and mounted thereon with a steering wheel, and a tubular housing having said steering shaft journalled therein, said fastening device comprising:

a stationary bracket mounted on a portion of the vehicle body structure for supporting said shaft assembly in place at a predetermined angle;

a movable bracket secured to said tubular housing and pivoted to said stationary bracket for angular adjustment of said steering wheel in a vertical direction, said movable bracket being provided at a free end thereof with a toothed portion in the form of a sector gear;

a latch member pivoted to a side portion of said stationary bracket and movable between a locked position in which said latch member is in engagement with the toothed portion of said movable bracket to lock said steering wheel in a selected angular position and an unlocked position in which said latch member disengages from the toothed portion of said movable bracket to permit free movement of said movable bracket;

a first manual lever pivoted to said stationary bracket and movable perpendicularly with respect to the pivot axis;

an engaging element provided on said first manual lever and in engagement with said latch member for maintaining it in the locked position when said first manual lever is in a released position and for permitting movement of said latch member to the unlocked position when said first manual lever is operated to a predetermined angular position from its released position;

first resilient means for biasing said first manual lever toward its released position;

second resilient means for biasing said steering wheel into a remote position upwardly with respect to the selected angular position; and first cam means cooperable with said first manual lever for effecting movement of said latch member to the unlocked position in response to operation of said first manual lever to the predetermined angular position and for permitting movement of said latch member to the locked position in response to release of said first manual lever;

a movable plate mounted on the pivot axis and movable perpendicularly with respect to the pivot axis, said movable plate being integrally formed at one end thereof with a receiver portion which is releasably in engagement with the toothed portion of said movable bracket to determine the locked position of said latch member and to receive thereon said latch member when located in its unlocked position;

third resilient means for biasing said movable plate toward the toothed portion of said movable bracket;

a second manual lever pivoted to said stationary bracket and movable perpendicularly with respect to the pivot axis, said second manual lever being arranged to be engaged with said first manual lever when operated toward said first manual lever over a predetermined angle;

fourth resilient means for biasing said second manual lever toward a released position spaced from the released position of said first manual lever;

stopper means for receiving said second manual lever by engagement therewith to maintain it in its released position;

second cam means cooperable with said second manual lever for disengaging the receiver portion of said movable plate from the toothed portion of said movable bracket in response to operation of said second manual lever toward the first manual lever and for engaging the receiver portion of said movable plate with the toothed portion of said movable bracket in response to release of said second manual lever; and retainer means for retaining the receiver portion of said movable plate by engagement therewith in its disengaged position;

wherein said movable bracket further is provided with a lateral projection which is arranged to be abutted against an end face of said movable plate when relative angular movement between said movable bracket and said movable plate caused by an error in operation of said second manual lever reaches a predetermined angle.

2. A fastening device for a tiltable steering shaft assembly as set forth in claim 1, wherein the toothed portion of said movable bracket is in the form of a toothed portion of a ratchet member secured to a free end of said movable bracket, and said lateral projection of said movable bracket is in the form of a lateral pin fixed to said ratchet member, and wherein said movable plate is integrally provided at the other end portion thereof with a lug to be abutted against said lateral pin of said ratchet member.

3. A fastening device for a tiltable steering shaft assembly as set forth in claim 2, wherein said second cam means is arranged adjacent said lateral pin and lug.

4. A fastening device for a tiltable steering shaft assembly as set forth in claim 1, wherein said first and second manual levers are coaxially pivoted to said stationary bracket, and wherein said first cam means comprises a first lateral pin fixed to a free end of said latch member, and a first cam slot formed in said first manual lever to receive said first lateral pin therein, and said second cam means comprises a second lateral pin fixed to the other end portion of said movable plate, and a second cam slot formed in said second manual lever to receive said second lateral pin therein, said first cam slot being in engagement with said first lateral pin in such a way as to move said latch member to the unlocked position in response to operation of said first manual lever toward the predetermined angular position and to permit movement of said latch member to the locked position in response to release of said first manual lever, and said second cam slot being in engagement with said second lateral pin in such a way as to disengage the receiver portion of said movable plate from the toothed portion of said movable bracket in response to operation of said second manual lever toward said first manual lever and to permit engagement of the receiver portion of said movable plate with the toothed portion of said movable bracket in response to release of said second manual lever.

* * * * *